Patented Aug. 31, 1954

2,687,966

UNITED STATES PATENT OFFICE 2,687,966

FOUNDRY MOLDING MATERIAL

Howard W. Miner and Edward J. Rock, Beloit, Wis., assignors to Fairbanks, Morse & Co., Chicago, Ill., a corporation of Illinois No Drawing. Application December 21, 1951, Serial No. 262,884

1 Claim. (Cl. 106—38.3)

This invention relates to the art of molding as practiced in foundries in connection with the production of castings from various kinds of metals and metal alloys. More particularly it has to do with improvements in the composition of the foundry sand from which mold parts, such as cores, are made.

Many cast objects have passages which must have a high degree of smoothness in order that material passing through the passages will not be damaged. A typical example of such passages are the flow passages of centrifugal pumps employed to move fruit or vegetables or articles of frangible nature. Since long passages are inaccessible for grinding, it is desirable that the walls of the passage be made as smooth as possible by the casting operation itself.

At present in many foundries the cores used to form passages in castings are made of silica sand with binders mixed therein. The smoothness of the core surface is regulated only by the predominating sizes of the grains of sand used. Since even cores made with sand containing grains of 50- to 70-mesh size do not produce surfaces smooth enough for some applications, the use of finely divided materials such as silica flour in the core sand mixes has been proposed. It has been found that these mixes not only do not appreciably improve the surfaces of the core, but they reduce the permeability of the core.

It is also well known that silica sand has a relatively high coefficient of expansion. This property of silica sand often causes fissures and cracks in the surface of the core. Molten metal entering these cracks produces fins and the like on the casting.

An important object of the present invention is the provision of molds and mold parts, such as cores, for the making of metallic castings, that are easily prepared in accordance with standard practices and which are characterized by a smooth, continuous, metal-contacting surface that produce smooth passages or cored surfaces in the cast metal object.

Another object of this invention is to provide a sand core mixture that will increase the permeability of the core, thus increasing the extent of oxidation of the core as compared to that of a silica sand core for the same baking time.

A further object of the present invention resides in the provision of a sand-core mixture which will give high flowability and which can be made of comparable strength utilizing less binders, such as linseed oil and commercial compounded core oils.

A still further object is to provide a core mix having a coefficient of expansion less than that of silica sand.

According to the general features of the present invention, furnace slag in granular form is mixed with silica sand and a suitable binder to form a mix from which cores are made. In the present specification the term "granular" is intended to include small particles or granules in various forms such as globules, spheroids and various irregular shapes. When the molten metal contacts the core in the mold, the core contracts as the slag grains in the core soften and become fluid, due to the temperature and pressure. The expanding property of silica sand is counteracted by the presence of the slag. Thus fins and the like are eliminated. A smooth surface continuity is effected and maintained with the result that a smooth passage or cored surface is formed in the casting.

When furnace slag is used in the core mix, such permeability-decreasing materials as silica flour, zirconite flour, clay, bentonite, and the like are not needed. Therefore the permeability of a core made from slag sand is greater than a similar core made from silica sand.

The granular slag used in the present invention for producing a core having a smooth surface is obtained as a byproduct of the manufacture of rock wool from commercially available slags such as blast furnace and open hearth furnace slag. The melted slag is poured past steam jets which form it into long filaments. Globules forming on the end of the filaments break off and fall to the bottom as the byproduct. In appearance, the byproduct is a greenish yellow glassy material the globular elements of which have a substantially spherical configuration and are slightly larger in size than the grains of silica sand used.

While the exact composition of the slag varies somewhat, depending upon the process from which it is obtained, one composition which has given excellent results is as follows:

| | Percent |
|---|---|
| Silica | 37.32 |
| Iron oxide | 0.65 |
| Aluminum oxide | 11.48 |
| Calcium oxide | 40.47 |
| Magnesium oxide | 8.50 |
| Manganese oxide | 0.45 |
| Soda | 0.98 |

In preparing the core mix, the slag granules are screened over a 20 mesh screen to remove slag wool, slag needles, and debris. The screened slag is then mixed with silica sand in predetermined proportions and the usual core binders, and drying oil is added. The core is formed by ramming the sand mixture into a core box, the interior of which has the desired shape and dimension. The mixing of slag with the silica sand increases the flowability of the core mix over what it would be if only silica sand were used. Thus the sand mix of the present invention readily flows into all recesses of the core box as it is rammed or blown in under pneumatic pressure. After the core is formed it is placed on a drying plate and heated in an oven to assist in finally obtaining a hard core.

The addition of slag to the silica sand tends to open up the sand and increase the permeability of the mix. In this way the oxidation of the linseed oil binder is accelerated and the required baking time decreased. Also, the enhanced packing ability of the spherical grains of slag over the irregular shaped silica sand grains increases the tensile strength of the resultant core. Therefore less oil binder is required to attain an equivalent tensile strength than is required for a silica sand core.

Cores which contain a certain percentage of slag will take a greater thermal shock than silica sand cores. This characteristic of slag sand cores prevents core cracking at the higher temperatures and hence eliminates defective castings due to veins and fissures in the core. The fusion point of the core mix is lowered when slag is used in the mix. This is due to the fact that slag grains have a fusion temperature, depending upon its exact composition, in the range of 1700°–1900° F. while silica sand fuses at about 3100° F. depending on its purity. If an eutectic of slag and sand is formed, the fusion point will be lower than that of the respective constituents.

After the core is formed it is baked in an oven at a temperature of from 450° to 475° F. While this is a typical baking temperature range, it will be understood that the baking temperature is dependent on the type of core binder or binders used. During this baking, moisture and other volatile matter are driven off and the core oils are hardened. After the core has been placed in the mold, molten metal is poured into the mold. The relatively high temperature of the molten metal causes fusion of the sand-slag mix and the slag forms a smooth, glassy surface on the core.

It will be appreciated that metals and alloys have different pouring temperatures. Since the action of the slag in the core depends upon the temperature of the molten metal and the pressure that the molten metal exerts on the core, the proportions of slag and sand used in the core mix must be varied in accordance with the metal being poured. Also, the section size must be given consideration. The larger or thicker the section involved, the less the percentage of slag required.

For casting brass articles, cores made from the following mixes have been very successful.

| | Mix #1 | Mix #2 |
|---|---|---|
| Slag | 100 lbs | 575 lbs. |
| Silica Sand | 25 lbs | 25 lbs. |
| Cereal Binder (corn flour) | 1 lb. 9 oz. | 4¼ lbs. |
| Core Oil (linseed oil base) | 1 19/20 pints | 11 pints. |
| Dryer | | 1¾ lbs. |

For casting iron articles, cores made from the following mixes have given very good results.

| | Mix #1 | Mix #2 |
|---|---|---|
| Slag | 25 lbs | 250 lbs. |
| Silica Sand | 125 lbs | 350 lbs. |
| Cereal Binder | 1 lb. 9 oz. | 4¾ lbs. |
| Core Oil (linseed oil base) | 2 pints | 10 pints. |
| Dryer | | 1¾ lbs. |

Although specific proportions of ingredients have been given as preferable, it is possible to make this core mix without adhering exactly to the stated proportions. The following table gives the permissible range by weight for the various substances, the proportions of slag and sand and the quantities of the added ingredients all individually being expressed in percent of the combined weight of the sand and slag, which will be substantially the weight of the batch of core mix being prepared.

| | Core Mix for Brass Castings, percent | Core Mix for Iron Castings, percent |
|---|---|---|
| Slag | 80-96 | 16-42 |
| Silica sand | 20-4 | 84-58 |
| Cereal binder | 1 | 1 |
| Core oil | 1 | 1 |
| Dryer | 0.3 | 0.3 |
| Water | 3-6 | 3-6 |

From the foregoing description it will be seen that the improved sand mix is ideally suited for making cores which must have smooth, continuous metal-contact surfaces. The novel use of furnace slag in core mixes results in castings with smoother passages than heretofore attained with cores made from any other mix.

It will be understood that modifications and variations may be effected without departing from the scope of the novel concepts of the present invention.

We claim as our invention:

A core-forming mixture of the character described, comprising from about 4 percent to about 84 percent silica sand and from about 96 percent to about 16 percent granular slag, together with core oil, cereal binder, dryer and water in aggregate quantity approximating 8.3 percent of the combined weight of the sand and slag comprising whole slag granules, wherein the granular slag is characterized by slag granules of generally spherical form and of a granular size approximating the granular size of the sand grains.

References Cited in the file of this patent
UNITED STATES PATENTS

| Number | Name | Date |
|---|---|---|
| 821,718 | Janitschek | May 29, 1906 |
| 1,053,787 | Conard | Feb. 18, 1913 |
| 1,571,014 | Lehr | Jan. 26, 1926 |
| 1,867,382 | Sampson | July 12, 1932 |
| 1,975,399 | Malaspina | Oct. 2, 1934 |
| 2,507,082 | Allison | May 9, 1950 |

FOREIGN PATENTS

| Number | Country | Date |
|---|---|---|
| 585 | Great Britain | Mar. 4, 1862 |